June 3, 1952     J. C. DUDLEY     2,599,440

METHOD FOR INSTALLING RESILIENT SEALS

Filed Jan. 31, 1948

INVENTOR.
John C. Dudley.
BY
Harness and Harris
ATTORNEYS.

Patented June 3, 1952

2,599,440

UNITED STATES PATENT OFFICE 2,599,440

METHOD FOR INSTALLING RESILIENT SEALS

John C. Dudley, Highland Park, Mich., assignor to Chrysler Corporation, Highland Park, Mich., a corporation of Delaware Application January 31, 1948, Serial No. 5,662

2 Claims. (Cl. 20—69)

This invention relates to a method for installing rubber seals, the method being particularly applicable to the installation of rubber sealing strips in automobile door constructions.

It has been found that those portions of the sealing strips which are bent around the sharp corners or the highly curved portions of the supporting framework become highly stressed when the seal is first applied. If these highly stressed portions remain exposed to the air for a relatively short period of time after installation of the seal then minute cracks or checks develop along the stressed portions of the seal and subsequently there is a deterioration of the portions of the seal which have been highly stressed as a result of the stressing during installation. This increase in stress concentration is particularly noticeable in the cantilever type of resilient seal which is now being used to a much greater extent.

To prevent the deterioration of those portions of the seal which become highly stressed upon installation I propose applying a thin coating of some air impervious material to the exposed surfaces of the seal along the highly stressed portions. To be effective this air impervious coating must be applied within a reasonably short time after the stresses are setup in the seal. Emulsions of wax, various forms of resins, lacquers, and coatings of butyl or neoprene rubber are a few of the substances that can be used to form a protective film for the stressed portions of the seal.

It is an object of this invention to provide a method for installing rubber door seals, or the like, which is simple, economical, and which prevents deterioration of those portions of the seal which become highly stressed due to installation of the seal.

It is a further object of this invention to provide an improved method of installing rubber closure seals which merely adds an additional step to the normal procedure for installing such seals, the additional step being relatively simple and involving practically no additional cost while providing an effective means for extending the life of the seal.

It is another object of this invention to provide a method for installing rubber seals which method prevents deterioration of the seal and reinforces the portions of the seal most likely to break down.

Other objects and advantages of this invention will become apparent from the following description of my method when considered in conjunction with the drawings in which.

Figure 1:
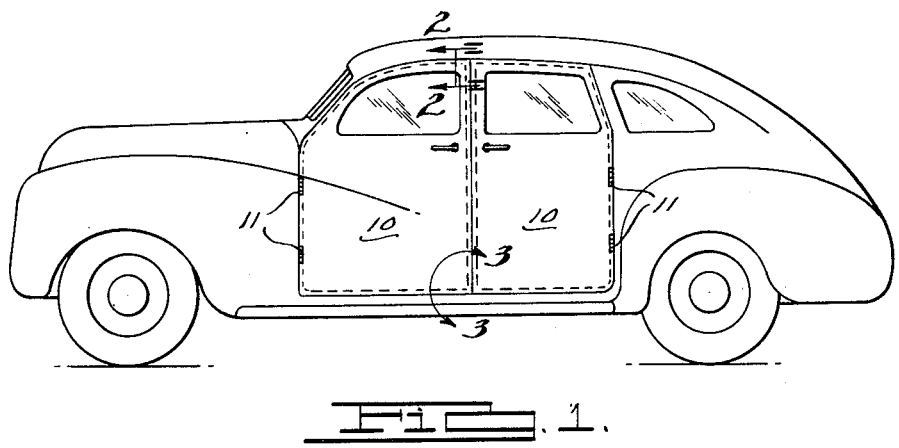
Fig. 1 is a side view of an automobile equipped with a door cushion and sealing means applied in accordance with my invention.
Figures 2, 3:
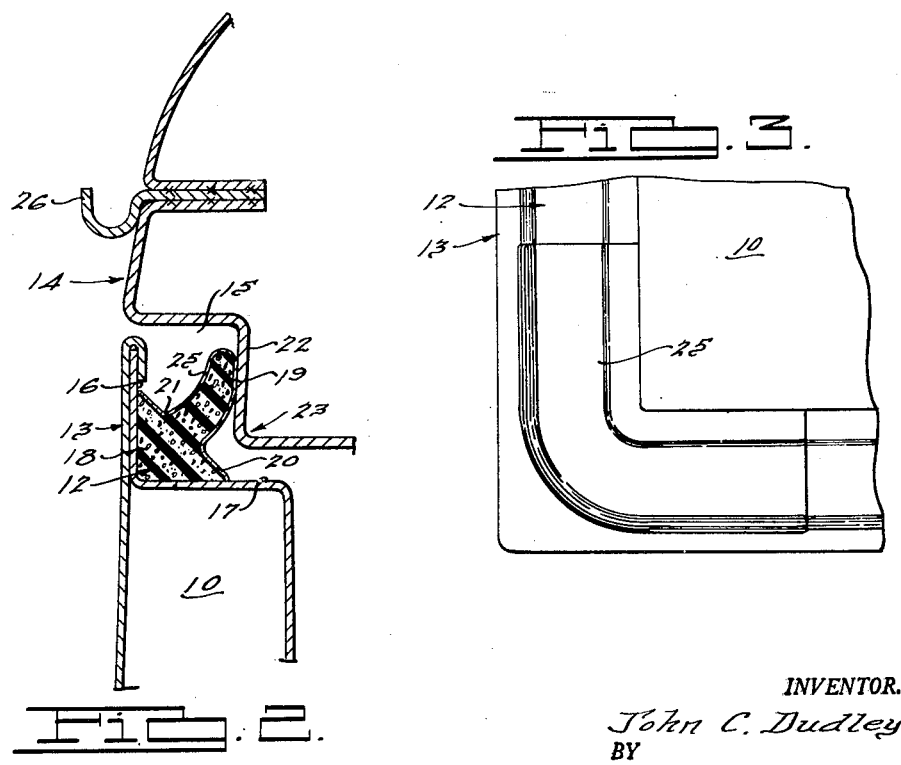
Fig. 2 is an enlarged sectional view taken along the line 2—2 of Fig. 1, indicating the position of the sealing finger after closing of the door.
Fig. 3 is an enlarged, fragmentary, elevational view of that portion of the inside of the front door within the arc 3—3 of Fig. 1.

Each door 10, supported on the usual hinges 11, is provided with a cushioning and sealing strip 12. Sealing strip 12 is mounted on the side edge of the door adjacent the inside face of the door marginal flange 13. The door frame 14 has a continuous marginal recess 15 adapted to receive the sealing strip 12 and the flange 13 of the door so that the outside of the door will be substantially flush with the outside of the body when the door is closed. The flush relationship between the door and body is preferably maintained at all points around the door except along the top of the door where, as disclosed in Fig. 2, the body is preferably formed with an outwardly projecting gutter 26 to prevent drainage into the sealing joint between the door and the body. The sealing strip 12 will ordinarily be provided around the entire periphery of the door, the continuity of the strip being indicated by dashed lines in Fig. 1. The strip 12 is preferably of molded sponge rubber or some similar resilient material and can be formed with an outer skin on its exposed surfaces to improve its wearing characteristics. The sealing strip 12 is cemented, or otherwise suitably anchored by pins, wires, clips or the like, to the inside wall 16 of the door flange 13 and to the side edge 17 of the door 10. The seal 12 is formed in cross section so as to be symmetrically shaped and is provided with a right angled base portion 18 adapted to be seated in the corner between the door flange 13 and the side edge 17 of the door. In cross section this base portion 18 is substantially of an isosceles triangular configuration having the rear base side 20 extending at approximately forty-five degrees with both the door side wall 17 and the vertical door flange 13. The base portion 18 of the sealing strip 12 resembles in cross section an arrowhead and is adapted to have the pointed or vertex portion seated in the corner between the flange 13 and edge 17. Extending outwardly from the medial region of the rear side 20 of the symmetrically shaped base portion 18 of the sealing strip, along a line which bisects the angle between the sides of the base portion, is a long, symmetrically shaped, sealing finger 19. The dimensions and shape of the sealing finger 19 are such as to form an elongated projection with a relatively narrow throat portion 21 which connects finger 19 to base portion 18 and provides the necessary hinging action between the sealing finger 19 and the base portion 18. The long sealing finger 19 insures a perfect seal, regardless of the variations in clearance between the door and frame. Due to the symmetrical design of the sealing strip 12, it is obvious that regardless of the way in which the base portion 18 of the sealing strip 12 is placed in the corner between the side edge 17 and the marginal flange 13 of the door, the sealing finger 19 will always project at the same angle and consequently will always function in the same manner. This construction thereby eliminates the possibility of the sealing strip being installed in a reversed or backwards position so that the sealing finger 19 would be bent inwardly and compressed on door closing instead of being bent outwardly and tensioned against the wall 22 of door jamb 23. This specific form of sealing strip was originally disclosed in an application of Karl Pfeiffer, Serial No. 760,957, filed July 15, 1947, which application has since become abandoned.

After the sealing strip 12 has been installed on the side edge of the door and anchored in place by any suitable means, a coating or film 25 of some air impervious, fast setting, material such as wax, butyl or neoprene rubber, a lacquer, or a resin, is applied to the exposed surfaces of those portions of the sealing strip which have been stressed due to their being bent around sharp corners or curved portions of small radii along the door edge. The application of this air impervious coating to the highly stressed portions of the sealing strip, immediately after installation of the strip, permits the strip to set without exposure to the air and it has been found that such a process prevents cracking or checking or other forms of seal deterioration which otherwise would develop along the more highly stressed portions of the seal. In order to be successful it is imperative that the air impervious coating be applied within approximately 24 hours after installation of the seal, for after that period of time the highly stressed portions of the seal will have already set or checked while exposed to the air and it is this combination of circumstances which brings about deterioration of the seal.

This method of applying an air impervious coating to the more highly stressed portions of the seal, after the seal has been installed but before the seal material has an opportunity to develop cracks or checks, merely requires one additional step after installation of the seal and in no way alters the normal method for installing seals of this type. The air impervious coating may be applied by spraying or by brushing, either method being fast, simple and economical. The increased life of the seal due to this relatively simple method of seal preservation more than repays the slight additional expense involved in applying the air impervious coating to the seal. Furthermore, this coating of preserving material at the more highly stressed portions of the seal builds up and reinforces those portions of the seal most likely to be subjected to wear and this improves the seal from a wear resisting standpoint.

It is obvious that this method of installing rubber seals is applicable to any type of rubber seal that is deformed during installation and that this method is not restricted to door seals or the like.

I claim:

1. The method of applying a resilient sealing strip formed from material subject to checking to a supporting member comprising positioning said strip on said supporting member, stressing portions of said strip to cause the strip to conform to the shape of the supporting member, fastening the strip to the supporting member to retain the strip in the stressed, shape conforming condition, and immediately thereafter coating the exposed surfaces of the more highly stressed portions of the strip with a film of air impervious material that is flexible and check-proof, said coating being applied within the time required for the sealing strip to check after its installation on said supporting member.

2. The method of applying a sealing strip of checkable, rubber-like material to the marginal edge of a door comprising positioning the sealing strip on the marginal edge of the door and stressing the strip so that the strip conforms to the shape of the adjacent marginal edge portion, anchoring the strip to the marginal edge portion so as to retain the shape conforming relationship, and immediately thereafter applying a coating of resilient, check-proof, weather and wear resistant resin to the exposed surfaces of the more highly stressed portions of said strip to retard deterioration thereof by checking or the like, said resin coating being applied within the time required for the strip material to develop checking or cracking after its installation on the door edge.

JOHN C. DUDLEY.

REFERENCES CITED

The following references are of record in the file of this patent:

UNITED STATES PATENTS

| Number | Name | Date |
|---|---|---|
| 2,216,830 | Roberts | Oct. 8, 1940 |
| 2,232,570 | Spraragen | Feb. 18, 1941 |
| 2,267,433 | Tea | Dec. 23, 1941 |
| 2,401,395 | Winkley | June 4, 1946 |
| 2,417,481 | Froustey | Mar. 18, 1947 |
| 2,459,120 | Spraragen | Jan. 11, 1949 |